(12) United States Patent
Syed et al.

(10) Patent No.: US 11,922,032 B1
(45) Date of Patent: Mar. 5, 2024

(54) CONTENT RELOCATION AND HASH UPDATES IN ALGORITHMIC TCAM

(71) Applicant: DreamBig Semiconductor Inc., San Jose, CA (US)

(72) Inventors: Sohail A Syed, San Jose, CA (US); Hillel Gazit, Palo Alto, CA (US); Hon Luu, San Jose, CA (US); Pranab Ghosh, Pleasonton, CA (US)

(73) Assignee: DreamBig Semiconductor Inc., San Jose, CA (US)

( * ) Notice: Subject to any disclaimer, the term of this patent is extended or adjusted under 35 U.S.C. 154(b) by 64 days.

(21) Appl. No.: 17/710,798

(22) Filed: Mar. 31, 2022

Related U.S. Application Data (60) Provisional application No. 63/168,921, filed on Mar. 31, 2021.

(51) Int. Cl.
*G06F 3/06* (2006.01)

(52) U.S. Cl.
CPC .......... *G06F 3/0622* (2013.01); *G06F 3/0656* (2013.01); *G06F 3/0673* (2013.01)

(58) Field of Classification Search
CPC ..... G06F 3/0622; G06F 3/0656; G06F 3/0673
See application file for complete search history.

(56) References Cited

U.S. PATENT DOCUMENTS

| | | | |
|---|---|---|---|
| 7,643,353 B1 | 1/2010 | Srinivasan et al. | |
| 8,195,873 B2 | 6/2012 | Gazit | |
| 9,094,307 B1 | 7/2015 | Edsall et al. | |
| 9,262,312 B1 | 2/2016 | Gazit et al. | |

(Continued)

FOREIGN PATENT DOCUMENTS

| | | |
|---|---|---|
| WO | WO-98/007160 | 2/1998 |
| WO | 2007038805 | 4/2007 |

OTHER PUBLICATIONS

"U.S. Appl. No. 17/710,891, Ex Parte Quayle Action dated Nov. 25, 2022", 7 pgs.

(Continued)

*Primary Examiner* — Zhuo H Li
(74) *Attorney, Agent, or Firm* — Schwegman Lundberg & Woessner, P.A.

(57) ABSTRACT

A content addressable memory circuit is provided that includes: multiple integrated circuit memory devices that include memory address locations that share common memory addresses; buffer circuits operatively coupled to the memory devices; a hash table that includes a plurality of hash values that each corresponds to one or more key values; one or more processor circuits configured with instructions to perform operations that include: assigning each hash value to a memory address location based upon a first portion of the hash value; storing each key value at a memory address location assigned to a first portion of a hash value that corresponds to the key value; copying a first key value from a first memory address location within a memory device to a buffer circuit operatively coupled to the memory device; copying the first key value from the buffer circuit operatively coupled to the memory device to a second memory address location of the memory device; and assigning a second portion of a hash value that corresponds to the first key value to the second memory address location of the memory device.

17 Claims, 9 Drawing Sheets

(56) References Cited

U.S. PATENT DOCUMENTS

| | | |
|---|---|---|
| 9,306,851 B1 | 4/2016 | Gazit et al. |
| 9,424,366 B1 | 8/2016 | Gazit et al. |
| 9,639,501 B1 | 5/2017 | Gazit et al. |
| 10,254,968 B1 | 4/2019 | Gazit et al. |
| 10,318,587 B1 | 6/2019 | Bosshart et al. |
| 10,778,721 B1 | 9/2020 | Holbrook et al. |
| 10,887,233 B2 | 1/2021 | Labonte et al. |
| 11,683,039 B1 | 6/2023 | Syed et al. |
| 11,720,492 B1 | 8/2023 | Syed et al. |
| 2009/0190404 A1 | 7/2009 | Roohparvar |
| 2012/0198107 A1 | 8/2012 | Mckean et al. |
| 2013/0242632 A1 | 9/2013 | Wada |
| 2015/0006808 A1 | 1/2015 | Miller et al. |
| 2015/0121034 A1 | 4/2015 | Steele, Jr. et al. |
| 2015/0169467 A1* | 6/2015 | Chase ............... G06F 16/9014 711/216 |
| 2017/0040059 A1 | 2/2017 | Arsovski et al. |
| 2017/0242618 A1 | 8/2017 | Tran et al. |
| 2018/0039662 A1 | 2/2018 | Asai et al. |
| 2023/0016020 A1* | 1/2023 | Kim .................... G06F 3/0604 |
| 2023/0251782 A1* | 8/2023 | Chang ................. G06F 3/0622 711/164 |

OTHER PUBLICATIONS

Demetriades, Socrates, et al., "An Efficient Hardware-basedMulti-hash Scheme for High Speed IP Lookup", Department of Computer Science University of Pittsburg, (Jun. 2008), 8 pages.

Meiners, Chad R., et al., "Algorithmic Approaches to Redesigning TCAM Based Systems", *Sigmetrics, '08IGMETRICS* Jun. 2-6, 2008, Annapolis, Maryland, (Jun. 2008), 2 pgs.

Pagiamtzis, Kostas, et al., "Content-Addressable Memory (CAM) Circuits and Architectures: A Tutorial and Survey", *IEEE Journal of Solid-State Circuits*, 41(3), (Mar. 2006), 16 pages.

Ravikumar, V. C., et al., "TCAM Architecture for IP Lookup Using Prefix Properties", Published by the IEEE Computer Society 0272-1732/04, (Mar.-Apr. 2004), 10 pages.

Sheu, Jang-Ping, et al., "Efficient TCAM Rules Distribution Algorithms in Software-Defined Networking", *IEEE Transactions on Network and Service Management*, 15(2), (Jun. 2018), 12 pages.

Song, Yibo, et al., "A Low-power Content-Addressable Memory (CAM) Using Pipelined Search Scheme", *ICWET '10: Proceedings of the International Conference and Workshop on Emerging Trends in Technology*, (Dec. 2009), 6 pages.

Trinh, Nguyen, et al., "Algorithmic TCAM on FPGA with data collision approach", *Indonesian Journal of Electrical Engineering and Computer Science*, (Apr. 2021), 89-96.

"U.S. Appl. No. 17/710,891, Response filed Jan. 18, 2023 to Ex Parte Quayle Action dated Nov. 25, 2022", 5 pgs.

"U.S. Appl. No. 17/710,891, Notice of Allowance dated Feb. 8, 2023", 8 pgs.

"U.S. Appl. No. 17/710,678, Notice of Allowance dated Mar. 16, 2023", 19 pgs.

"U.S. Appl. No. 17/710,678, Corrected Notice of Allowability dated Mar. 30, 2023", 4 pgs.

"U.S. Appl. No. 17/710,678, Corrected Notice of Allowability dated Apr. 10, 2023", 4 pgs.

Bremier-Barr, Anat, "Encoding Short Ranges in TCAM Without Expansion: Efficient Algorithm and Applications", SPAA '16, Jul. 11-13, 2016, Pacific Grove, CA, (2016), 35-46.

Liu, Huan, "Efficient Mapping of Range Classifier into Ternary-CAM", Proceedings 10th Symposium on High Performance Interconnects (HOTI '02), (2002), 6 pgs.

Meiners, Chad R., "Bit Weaving: A Non-Prefix Approach to Compressing Packet Classifiers in TCAMs", IEEE ACM Transactions on Networking, vol. 20, No. 2, (Apr. 2011), 488-500.

Ullah, Inayat, "EE-TCAM: An Energy-Efficient SRAM-Based TCAM on FPGA", Electronics, 7(9), 186, (2018), 15 pgs.

Ullah, Zahid, "E-TCAM: An Efficient SRAM-Based Architecture for TCAM", Circuits, Systems, and Signal Processing, 33, (2014), 3123-3144.

Vegesna, S. M. Srinivasavarma, "A Novel Rule Mapping on TCAM for Power Efficient Packet Classification", ACM Transactions on Design Automation of Electronic Systems, vol. 24, .No. 5, Article 48, (Jun. 2019), 23 pgs.

Zhang, Chaoqin, "RETCAM: An Efficient TCAM Compression Model for Flow Table of OpenFlow", Journal of Communications and Networks, vol. 22, No. 6, (Dec. 2020), 484-491.

"U.S. Appl. No. 17/710,891, Corrected Notice of Allowability dated May 17, 2023", 2 pgs.

"U.S. Appl. No. 17/710,629, Non Final Office Action dated May 24, 2023", 10 pgs.

"U.S. Appl. No. 17/710,678, Corrected Notice of Allowability dated Jun. 26, 2023", 2 pgs.

"U.S. Appl. No. 17/710,629, Response filed Jul. 10, 2023 to Non Final Office Action dated May 24, 2023", 16 pgs.

"U.S. Appl. No. 17/710,572, Non Final Office Action dated Jul. 18, 2023", 13 pgs.

"U.S. Appl. No. 17/710,572, Examiner Interview Summary dated Aug. 23, 2023", 2 pgs.

Kyungbae, Park, "Resource-Efficient SRAM-Based Ternary Content Addressable Memory Ali Ahmed", Sanghyeon Baeg IEEE Transactions on Very Large Scale Integration (VLSI) Systems Year: 2017 | vol. 25, Issue: 4 | Journal Article | Publisher: IEEE, (Jan. 1, 2017).

"U.S. Appl. No. 17/710,572, Notice of Allowance dated Sep. 25, 2023", 9 pgs.

"U.S. Appl. No. 17/710,840, Notice of Allowance dated Oct. 4, 2023", 8 pgs.

"U.S. Appl. No. 17/710,572, Notice of Allowability dated Oct. 5, 2023", 5 pgs.

"U.S. Appl. No. 17/710,840, Corrected Notice of Allowability dated Oct. 13, 2023", 2 pgs.

\* cited by examiner

Fig.1

| KEY | RULE |
|---|---|

|     | $H_{b1}$ | $H_{b2}$ | $H_{b3}$ | $H_{b4}$ | $H_{b5}$ | $H_{b6}$ | $H_{b7}$ | $H_{b8}$ |
|-----|----------|----------|----------|----------|----------|----------|----------|----------|
| H1  | 0        | 1        | 0        | 1        | 0        | 1        | 1        | 0        |
| H2  | 1        | 1        | 0        | 1        | 1        | 1        | 0        | 1        |
| H3  | 0        | 1        | 0        | 0        | 1        | 0        | 1        | 1        |
| H4  | 1        | 1        | 1        | 0        | 1        | 0        | 1        | 0        |
| H5  | 0        | 1        | 0        | 0        | 0        | 1        | 1        | 1        |
| ... | ...      | ...      | ...      | ...      | ...      | ...      | ...      | ...      |
| H15 | 1        | 0        | 1        | 0        | 1        | 0        | 1        | 1        |

Fig. 9

CONTENT RELOCATION AND HASH UPDATES IN ALGORITHMIC TCAM

CROSS-REFERENCE TO RELATED APPLICATION

This application claims priority to U.S. provisional application Ser. No. 63/168,921, filed Mar. 31, 2021, entitled, ALGORITHMIC TERNARY CONTENT ADDRESSABLE MEMORY, which is incorporated herein in its entirety by this reference.

BACKGROUND

Content addressable memory (CAM) is a special type of memory that determines memory storage locations to associate with input data based upon the input data. A typical memory, such as a random access memory (RAM), is accessed based upon memory addresses. In contrast a CAM is accessed based upon content stored at one or more memory addresses. During a read operation of a typical memory, the memory receives an address value as an input and, in response, outputs a data value stored at a memory location corresponding to the received address value. A CAM operates in a different manner. During a read operation of a CAM, the CAM receives as input, content data that may be stored at some location in the CAM, and outputs an indication of whether that data value is present at a CAM address location. The content data received as input to a CAM during a read operation is commonly referred to as a search expression or as a key. During a typical CAM read operation, a CAM searches for stored entries in the CAM that match the key. A typical CAM can compare in parallel each of a plurality of content data values stored within the CAM with a key to determine whether there exists a stored content data value that matches the key and if so, output an indication of the match. Thus, a CAM accesses content (i.e., stored data values) by comparing content stored within the CAM with a key.

Applications of CAM include routing Internet packets, cache memory for microprocessors, and artificial intelligence to name just a few examples. Many network devices (e.g., bridges, switches, routers, gateways, network proxies), for example, use a ternary CAM for routing operations. A ternary CAM (TCAM) is referred to as ternary because it can store data in any of three different states: logic 0, logic 1 and X. Data having an "X" or "don't care" state is of no relevance to a content search being conducted. Algorithmic RAM-based TCAM typically uses two-bit values stored in RAM to represent individual ternary states. In other words, each of TCAM logic 0, logic 1, and X often is represented in RAM-based TCAM as a different combination of two binary bits. TCAMs have suffered from large use of resources. There is a need to reduce resources required for TCAM.

SUMMARY

In one aspect, a content addressable memory circuit. Multiple integrated circuit memory devices include memory address locations that share common memory addresses and that are coupled for simultaneous access. Buffer circuits are operatively coupled to the memory devices. A hash table includes a plurality of hash values. Each hash value corresponds to one or more key values. One or more processor circuits are configured with instructions to perform operations. The operations include assigning each hash value to a memory address location based upon a first portion of the hash value. The operations include causing storing of each key value in a memory device at a memory address location assigned to a first portion of a hash value that corresponds to the key value. The operations include causing a memory device to copy a first key value from a first memory address location within the memory device to a buffer circuit operatively coupled to the memory device. The operations include causing the memory device to copy the first key value from the buffer circuit operatively coupled to the memory device to a second memory address location of the memory device. The operations include assigning a second portion of a hash value that corresponds to the first key value to the second memory address location of the memory device.

In another aspect, a method to relocate key value within a content addressable memory is provided. The content addressable memory includes multiple integrated circuit memory devices that include memory address locations that share common memory addresses and that are coupled for simultaneous access. The content addressable memory includes multiple buffer circuits, each output buffer circuit operatively coupled to a different one of the multiple memory devices. The content addressable memory includes a hash table that includes a plurality of hash values, wherein each respective hash value corresponding to one or more key values. The method includes assigning each hash value to a memory address location based upon a first portion of the hash value. Each key value is stored in a memory device at a memory address location assigned to a first portion of a hash value that corresponds to the key value. The memory device outputs a first key value from a first memory address location within the memory device to a buffer circuit operatively coupled to the memory device. The memory device copies the first key value from the buffer circuit operatively coupled to the memory device to a second memory address location of the memory device. A second portion of a hash value that corresponds to the first key value is assigned to the second memory address location of the memory device.

BRIEF DESCRIPTION OF DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
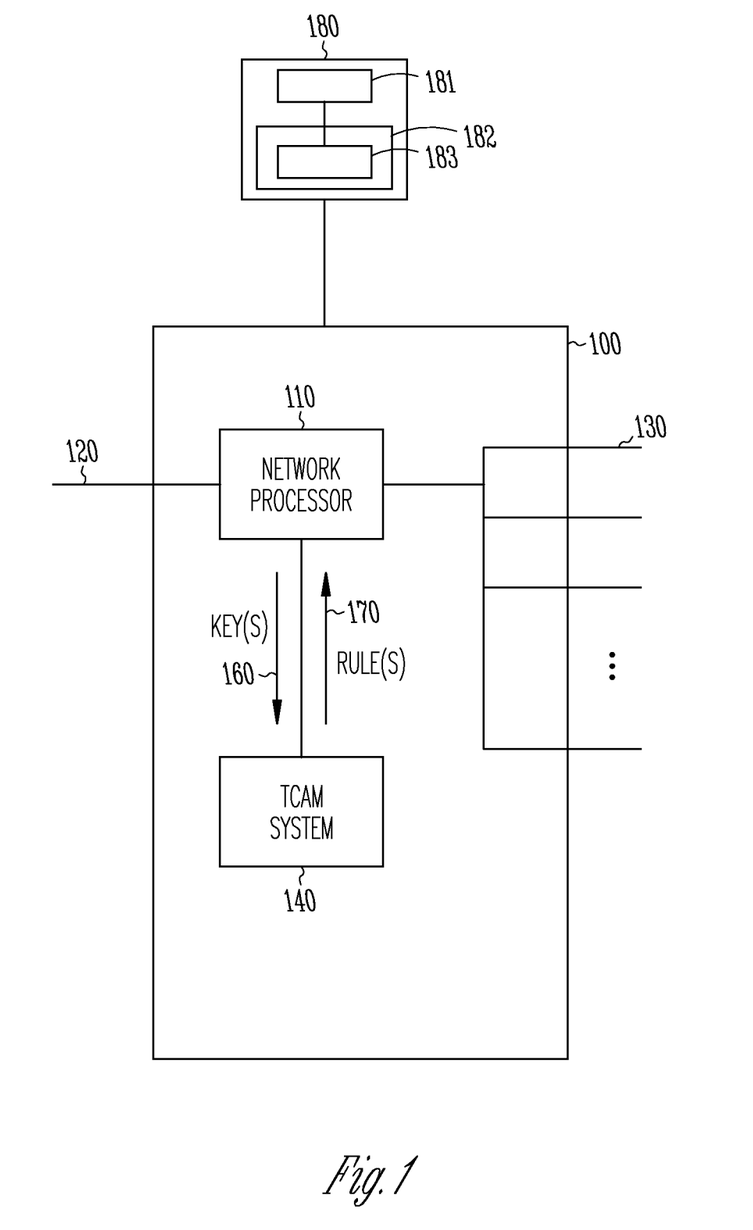
FIG. 1 is an illustrative drawing showing an example network device in accordance with some embodiments.

Overview:
(TBD)
Network Device:

FIG. 1 is an illustrative drawing showing an example network device 100. The network device 100 can include one or more integrated circuit (IC) devices, a larger device, such as a router or switch, or a combination of these. In some implementations, the network device 100 is coupled with a computing machine 180 within a network communications apparatus. The computing machine 180 can include multiple processor circuits 181 coupled to non-transitory memory 182 that includes instructions 183 to configure the computing machine 180 to perform operations described herein. In some implementations, the network device 100 is a network communications apparatus and includes the computing machine 180. The network device 100 can be coupled with a computer network, such as a local area network (LAN) or a wide area network (WAN), and processes data packets that comprise ordered sequences of binary data values.

The network device 100 includes a network processor device 110, which receives the packets or portions of packets on an input port or interface 120. The network processor 110 parses incoming packet information to identify relevant data fields that provide information for handling network operations, such as routing and forwarding. The network processor 110 can be coupled with a TCAM-based network rules search engine 140, hereinafter referred to as the "TCAM system" 140, which assists in determining appropriate actions to take in response to receipt of packets over a network. The network processor 110 extracts information from the packets, referred to as key information 160. The key information is used to identify rules that determine appropriate actions to take in response to the received packets. The key information represents data bits within a packet that indicate packet information such as network addresses or portions thereof, port numbers, other header and trailer information, or combinations thereof, for example. The network processor 110 can generate key information, also referred as a "keys", that uses ternary value bits, which can have any of three states, logic 0, logic 1, or X ("don't care"), to represent the binary bits extracted from a packet. In general, ternary value bits within a key that represent a logic value 0 or a logic value 1 contribute to identifying a rule that determines an action to take based upon a packet represented by the key, and ternary value bits within a key that represent an X state do not contribute to identifying a rule that determines an action take based upon the packet represented by the key.

Figure 2:
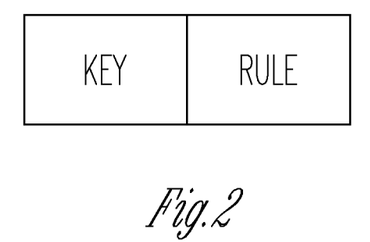
FIG. 2 is an illustrative drawing representing an example content data record that includes a key and an associated rule searched based upon the key.

The network processor 110 sends ternary key information 160 to the TCAM system 140, which stores rules associated with such key information that indicate corresponding action to take. In response to receipt of key information 160 corresponding to a packet, the TCAM system 140 returns one or more corresponding rules 170 identified using the key information 160. The network processor 110 determines actions to take based on the returned one or more rules 170. Such actions can include outputting a packet on a selected output port or interface 130 or dropping a packet, as appropriate, for example. The TCAM system 140 includes one or more memory devices to store keys in association with corresponding rules 170. Matches between previously stored keys and keys provided by the network processor 110, in response to received packets, are searched to identify rules to use to route or switch the received packets. FIG. 2 is an illustrative drawing representing an example content data record, stored in a memory device, that includes a key and an associated rule searched based upon the key.

Figure 3:
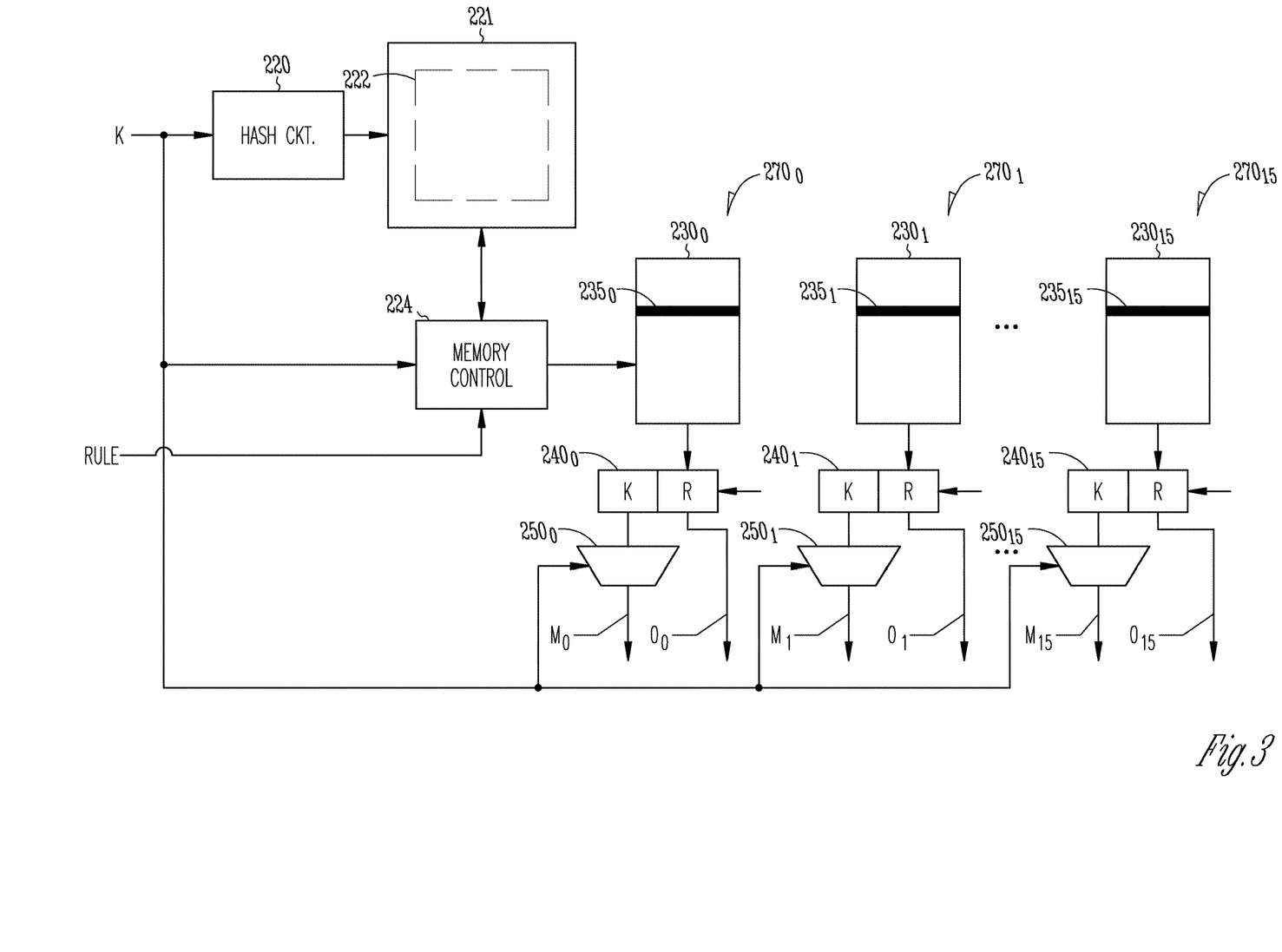
FIG. 3 is an illustrative drawing showing an example algorithmic TCAM system in accordance with some embodiments.

TCAM System:

FIG. 3 is an illustrative drawing showing an example TCAM system 140 implemented using algorithmic TCAM in accordance with some embodiments. The TCAM system 140 includes an input interface 210 on which a ternary key is received, hash logic circuitry 220, an integrated circuit storage device 221 that stores a hash table 222, multiple memory devices $230_0$-$230_{15}$, and storage control logic circuitry 224. The hash logic 220 determines hash values based upon key values. The hash values determine locations within the hash table 222 of address pointers to memory address locations within the memory devices $230_0$-$230_{15}$ at which the key values is stored.

The memory devices $230_0$-$230_{15}$ can include integrated circuit RAM memory devices of various types, such Static RAM (SRAM), Dynamic RAM (DRAM), Synchronous DRAM (SDRAM), Flash RAM, etc. For example, each memory device $230_0$-$230_{15}$ can be a 512×256 RAM. In addition, each of memory devices $230_0$-$230_{15}$ can have an associated output buffer circuit $240_0$-$240_{15}$ and comparator circuit $250_0$-$250_{15}$.

The example TCAM system 140 includes sixteen memory devices $230_0$-$230_{15}$. However, the number of memory devices employed in a TCAM system 140 (e.g., one, two, four, eight, sixteen, etc.) can vary with implementation. The hash logic 220 can be implemented in hardware or software. For instance, an example TCAM system 140 can use the computing machine 180 to implement the hash logic 220. The hash logic 220 is operable during a data write operations to determine hash values based upon received key values and to store the hash values in the hash table 222. The memory controller logic uses the hash table 222 to determine memory address locations at which to store keys in association with rules within one or more of the multiple memory devices $230_0$-$230_{15}$. The hash logic 220 is operable during data read operations to determine hash values based upon received key values and to use the hash table 222 to determine corresponding memory address locations from which to read previously stored keys and associated rules from one or more of the multiple memory devices $230_0$-$230_{15}$.

The hash logic 220 uses a logical or mathematical hash function to determine hash values based upon one or more ternary bits within key values received at the interface 210. The memory controller logic 224 uses the hash values access memory addresses in the memory devices $230_0$-$230_{15}$ for reads and writes. The hash logic 220 receives a key as input at interface 210 and based upon the received key, generates a value referred to as a hash value or hash that used to assign a common memory address that is present within each of the memory devices $230_0$-$230_{15}$. Hash functions and hash tables are well known to persons of ordinary skill in the art.

Write:

During a write, a key value (K) is received at the input lines $210_1$ and rule information (R) is received at input lines $210_2$. The hash logic 220 generates a hash value in response to a key value received at the key input $210_1$, which are stored and within the hash table 222. The hash value corresponds to a hash table memory location that stores a pointer to a common memory address that is present within each of memory devices. An example common memory address can include corresponding wordlines $235_0$-$235_{15}$ present within respective memory devices $230_1$-$230_{15}$. The memory controller 224 determines a memory device from among memory devices $230_1$-$230_{15}$ in which to store the key and a corresponding rule associated with the key, at the memory address corresponding to the key. For example, the memory controller may determine to store the key and associated rule at wordline $235_1$ in memory device $230_1$. A key and a corresponding rule may be referred to collectively herein as a "content data. The memory controller 224 determines a memory device from among memory devices $230_1$-$230_{15}$ in which to store the key and a corresponding rule at a determined common memory address. For example, the memory controller may determine to store the key and associated rule at wordline $235_1$ in memory device $230_1$. A key and a corresponding rule may be referred to collectively herein as a "content data".

Read:

During a read, a key value is received at the key interface $210_1$. The hash logic 220 produces a hash value in response to the received key value. The hash value indicates a location in the hash table 322 that stores a pointer to identify to a common memory address present within each of the memory devices $230_1$-$230_{15}$, such as a respective wordlines $235_0$-$235_{15}$ in which to search for a match for the received key value. The memory controller 224 causes read access of content data from one or more of the memory devices at the identified common memory address location. Output buffer circuits $240_0$-$240_{15}$ receive content data output by the one or more memory devices from the common memory address. The content data includes keys and rule information written previously to the memory devices. The comparators $250_0$-$250_{15}$ compare stored keys values received at corresponding buffers $240_0$-$240_{15}$ with the key value received at the key interface $210_1$ and provide an indication of whether there is a match. A comparator $250_0$-$250_{15}$ that detects a match sends a match signal on a corresponding match line $M_0$-$M_{15}$, which causes a corresponding output buffer to provide a rule on an output line $O_0$-$O_{15}$ for return to the network processor 110.

Content Data Relocation and Hash Value Adjustment:

FIGS. 4A-4D are illustrative drawings representing relocation activity during multiple example stages in relocation of content data within one more of memory devices $230_0$-$230_{15}$. Writes may occur while the TCAM system 140 is operative to process reads. In between writes, the network processor 110 may send a key value to the TCAM system 140, which causes a read from a memory address location assigned to a hash of the key value at one or more of memory devices $230_0$-$230_{15}$ and a return of a rule corresponding to a stored key that match the received key. In practice, content data records may be written into memory devices $230_0$-$230_{15}$ in a random order and as a result, previously written content data records may have to be relocated within the memory devices to accommodate content data records that are written later. There is a need to accomplish relocations of previously written content data records to accommodate newly written data content records without interrupting the ability to read the previously written content data records during such relocation.

Figure 4A:
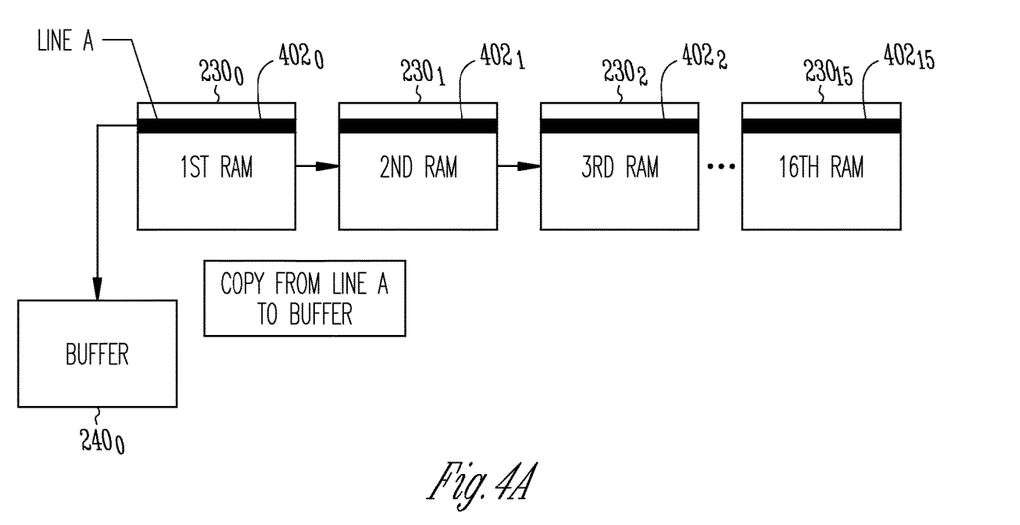
FIGS. 4A-4D are illustrative drawings representing example stages in relocation of content data within one more of memory devices of the example algorithmic TCAM system.

Referring to FIG. 4A and to FIG. 3, during an example first relocation stage, the memory controller 224 determines that relocation is required within one or more of the memory devices. $230_0$-$230_{15}$. A relocation involves relocation of content data from a an initial memory address location in a memory device to a different memory address location in the same memory device. For example, the memory controller 224 may determine that relocation of content data stored at one of a set of first common memory address locations $402_0$-$402_{15}$ within corresponding memory devices $230_0$-$230_{15}$. An example memory controller 224 can determine that content data relocation is required within one or more memory devices based upon a measure of availability level of a memory address locations within the memory devices $230_0$-$230_{15}$ to receive writes of additional content data. More particularly, an example memory controller 224 can determine that relocation is required at one or more common address memory locations, e.g., at one or more of the example first common memory address locations $402_0$-$402_{15}$, based upon a determination that each of the one or more common address memory locations within the memory devices $230_0$-$230_{15}$ already stores current content data, and therefore, no more instances of the common memory address location are available to receive newly written content data.

In response to a determination that content data at one or more of address locations $402_0$-$402_{15}$ are to be relocated, a determination is made as to which memory devices are to relocate the content data. During the example first stage, the memory address controller 224 determines individual memory devices in which content data relocation is to occur, based upon portions of the hash values corresponding to stored content data stored within the memory devices. An example memory controller 424 determines whether to relocate content data stored at the memory address $402_0$ based upon a first portion of a hash value that corresponds to a key value within first content data stored at the memory address $402_0$. Similarly, for example, memory controller 424 determines whether to relocate content data stored at the memory address $402_1$ based upon a first portion of a hash value that corresponds to a key value within second content data stored at the memory address $402_1$.

During the example first stage, assuming that a determination is made to relocate content data from the first memory device $230_0$, based upon a first portion of a hash value corresponding to content data stored in the first memory device $230_0$, the memory controller 224 causes the first memory device $240_0$ to copy first content data from the first common memory address location $402_0$ in the first device $230_0$ to the first output buffer $240_0$. For compactness of explanation in this disclosure, relocation is described primarily with reference to the first memory device $230_0$ and the corresponding first output buffer $240_0$. However, it will be understood that the relocation process explained herein can involve more than one of memory devices $230_0$-$230_{15}$ and corresponding output buffers $240_0$-$240_{15}$. In other words, the memory controller 224 may determine, based upon hash values, to relocate content data within each of multiple memory devices from a common memory address location to a different memory address location.

Figure 4B:
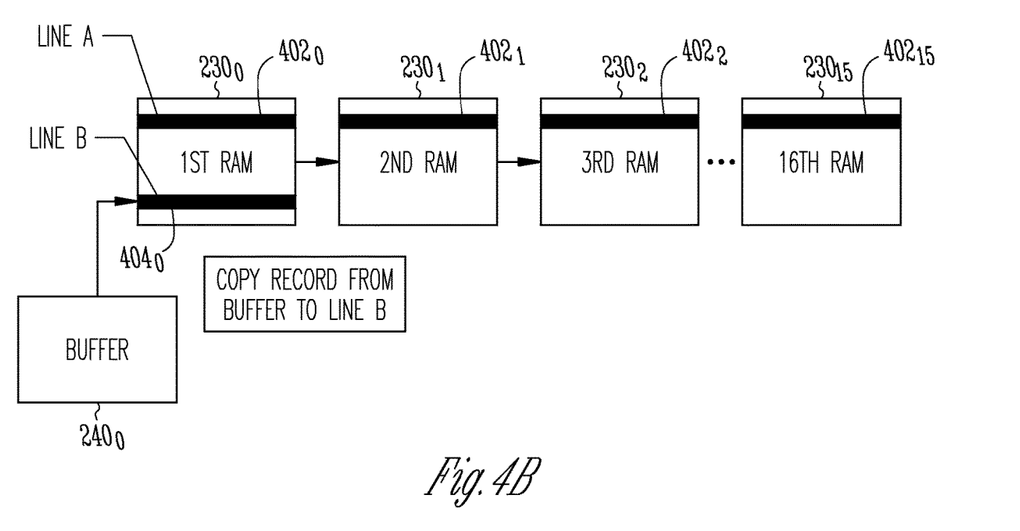

Referring to FIG. 4B, during an example second stage, the memory controller 224 causes the first memory device $230_0$ to copy the first content data from the first output buffer $240_0$ to a second common memory address location $404_0$, e.g., a second wordlineB, in the first memory device $230_0$.

Figure 4C:
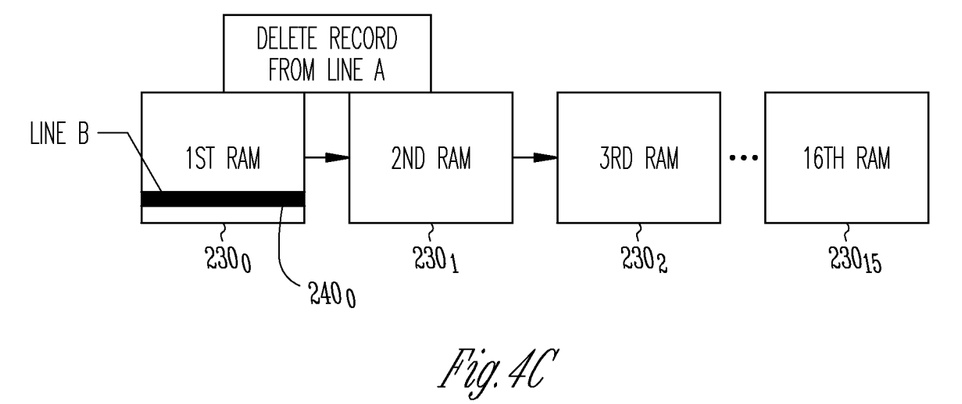

Referring to FIG. 4C, during an example third stage, the memory controller 224 causes the relocated first content data to become inaccessible at the first common memory address location $402_0$ within the first memory device $230_0$. More particularly, an example controller can cause the relocated content data to be erased or deleted from the first common memory address location $402_0$. Alternatively, the memory controller 224 can store a status value in a memory device to indicate that content data at the first memory address location $402_0$ in the first memory device $230_0$ from which content data has been relocated, no longer is current and can be overwritten.

Figure 4D:
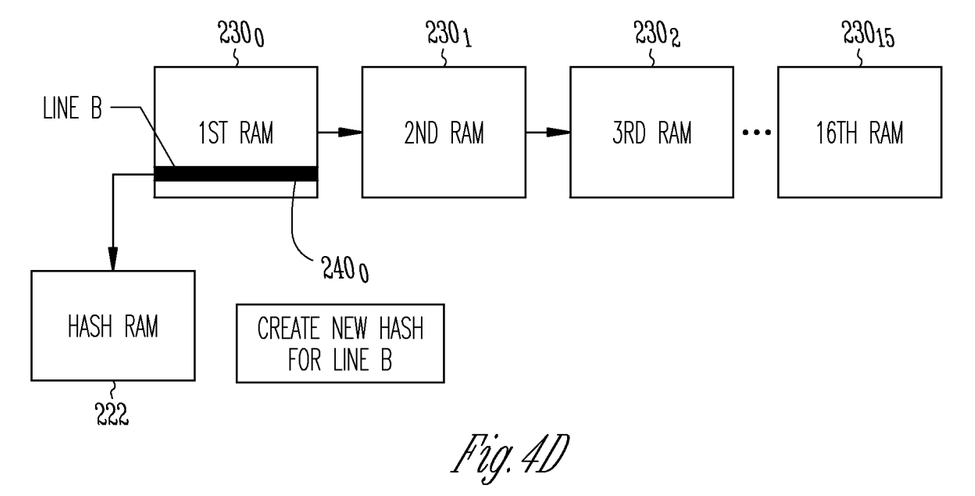

Referring to FIG. 4D, during an example fourth stage, the memory controller 224 assigns a new hash value to the memory address location $404_0$. More particularly, an example controller 224 assigns a second portion of the hash value that corresponds to the key value within the first content data to indicate the second memory address location $404_0$.

Thus, reads of relocated content data can occur during relocation of content data within a memory device. Before start of relocation and during the first, second, and third relocation stages, the first content data within the first memory device $230_0$ can be read from the first memory address location $402_0$ using a hash value corresponding to the first memory address location $402_0$. In response to the fourth relocation stage, the relocated first content data can be read from the second memory address location $404_0$ within the first memory device $230_0$ using a new hash value corresponding to the second memory address location $404_0$.

Example—Relocation and Hash Adjustment

Figure 5:
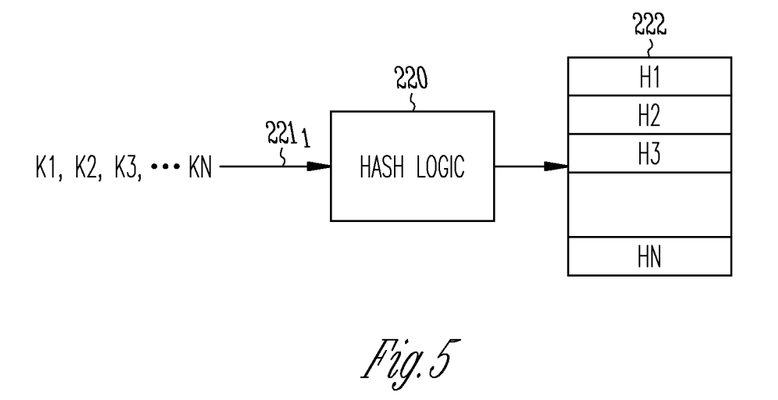
FIG. 5 is an illustrative drawing representing the hash logic receiving a sequence of key values and producing corresponding hash values, which are stored in the hash table.

FIG. 5 is an illustrative drawing representing the hash logic 220 receiving a sequence of N key values K1-KN at the key interface $210_1$ and producing N corresponding hash values H1-HN, which are stored in the hash table 222. During write operations, the example memory controller 224 causes storage of key values and corresponding rules (collectively referred herein to as "content data") at memory locations within the memory devices $230_0$-$230_{15}$ determined based upon the hash values. In an example TCAM system 140, each hash value is assigned to a common memory address present in each of the memory devices $230_0$-$230_{15}$. More particularly, in an example TCAM system 140, each hash value is assigned to a common (i.e., the same) wordline address present in each of the memory devices $230_0$-$230_{15}$. An example memory controller 224 causes storage of content data within a memory device at a memory address location corresponding to a hash value determined based upon a key value contained within the content data. The example memory controller 224 selects a particular one or more memory devices in which to store content data based at least in part upon availability of the memory address location within the memory devices.

Figure 6:
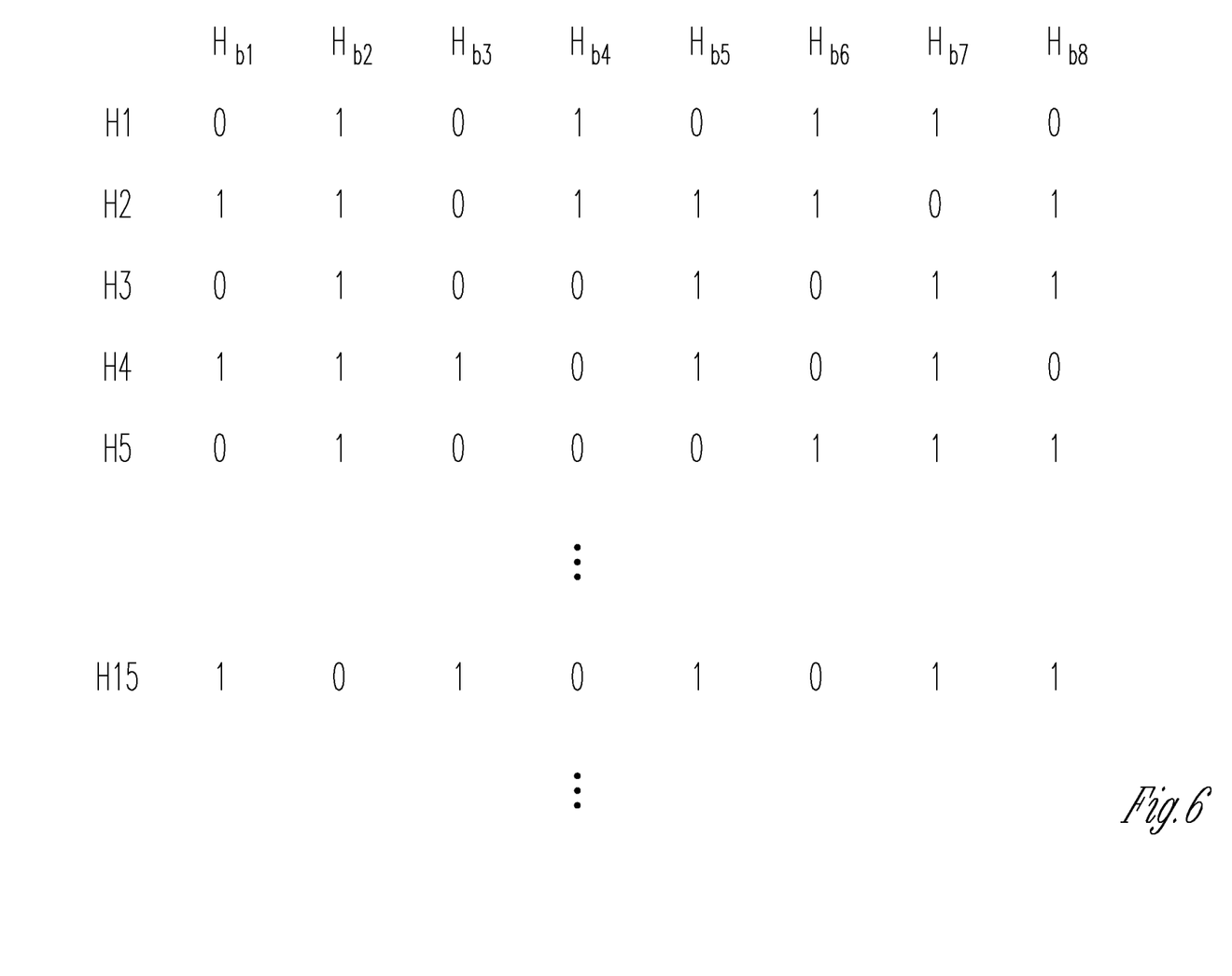
FIG. 6 is an illustrative drawing showing hash bit values of example hash values.

FIG. 6 is an illustrative drawing showing example hash bit values for certain ones of the hash values H0-HN. Each example hash value includes eight hash bits $H_{b1}$-$H_{b8}$ as indicated. In this example, each hash value includes eight hash bits. However, it will be understood that an example TCAM system 140 can have hash values that contain more than eight hash bits. In an example TCAM system 140, hash values used to determine memory address locations vary as more memory address locations have current content data written to them. More particularly, an example TCAM system 140 uses combinations of hash bits from the stored hash values to determine memory address locations at which to read and write content data. As content data is written to more memory address locations within the memory devices $230_0$-$230_{15}$, the hash value portions used to determine memory address locations at which to read and write content data are adjusted. For compactness of disclosure, the example hash bit values are shown only for hash values H1-H5 and H15.

Figure 7:
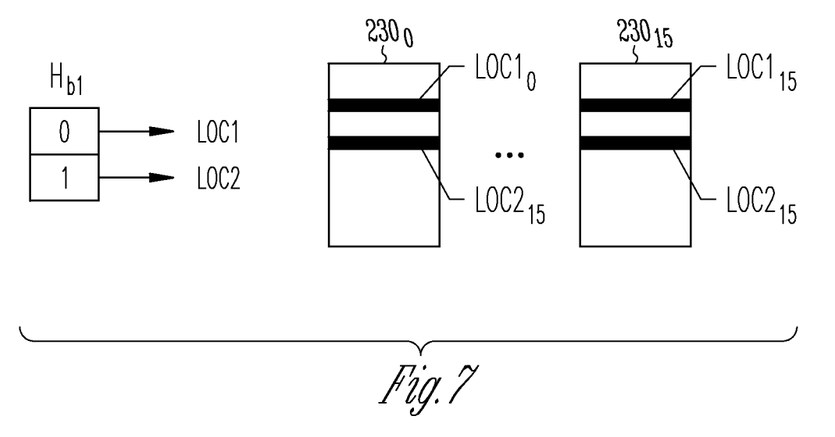
FIG. 7 is an illustrative drawing representing a first portion of a hash value used determine a first number of memory address locations.

FIG. 7 is an illustrative drawing representing a first portion of the hash values used determine a first number of memory address locations. More particularly, FIG. 7 is an illustrative drawing representing an example of storage of content data at first and second corresponding memory addresses location$1_0$-location$1_{15}$, and location$2_0$-location$2_{15}$ in the memory devices $230_1$-$230_{15}$ based upon a first portion of the hash values H0-HN comprising the first bit $H_{b1}$.

Figure 8:
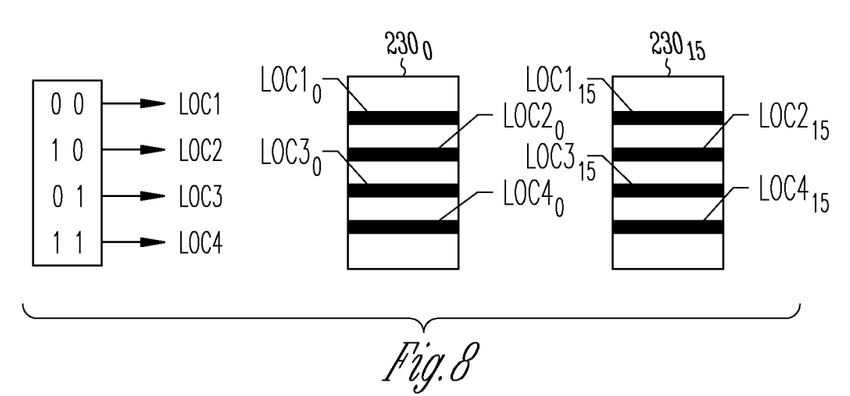
FIG. 8 is an illustrative drawing representing a second portion of a hash value used determine a second number of memory address locations larger than the first number.

FIG. 8 is an illustrative drawing representing a second portion of the hash values used determine a second number of memory address locations larger than the first number. More particularly, FIG. 8 is an illustrative drawing representing an example of relocation of content data from the first and second memory addresses location$1_0$-location$1_{15}$, and location$2_0$-location$2_{15}$ in one or more of the memory devices $230_1$-$230_{15}$ to third and fourth memory address addresses location$3_0$-location$3_{15}$ and location$4_0$-location$4_{15}$ in the one or more of the memory devices $230_1$-$230_{15}$ based upon a second portion of the hash values H0-HN comprising first and a second bits $H_{b1}$, $H_{b2}$.

Figure 9:
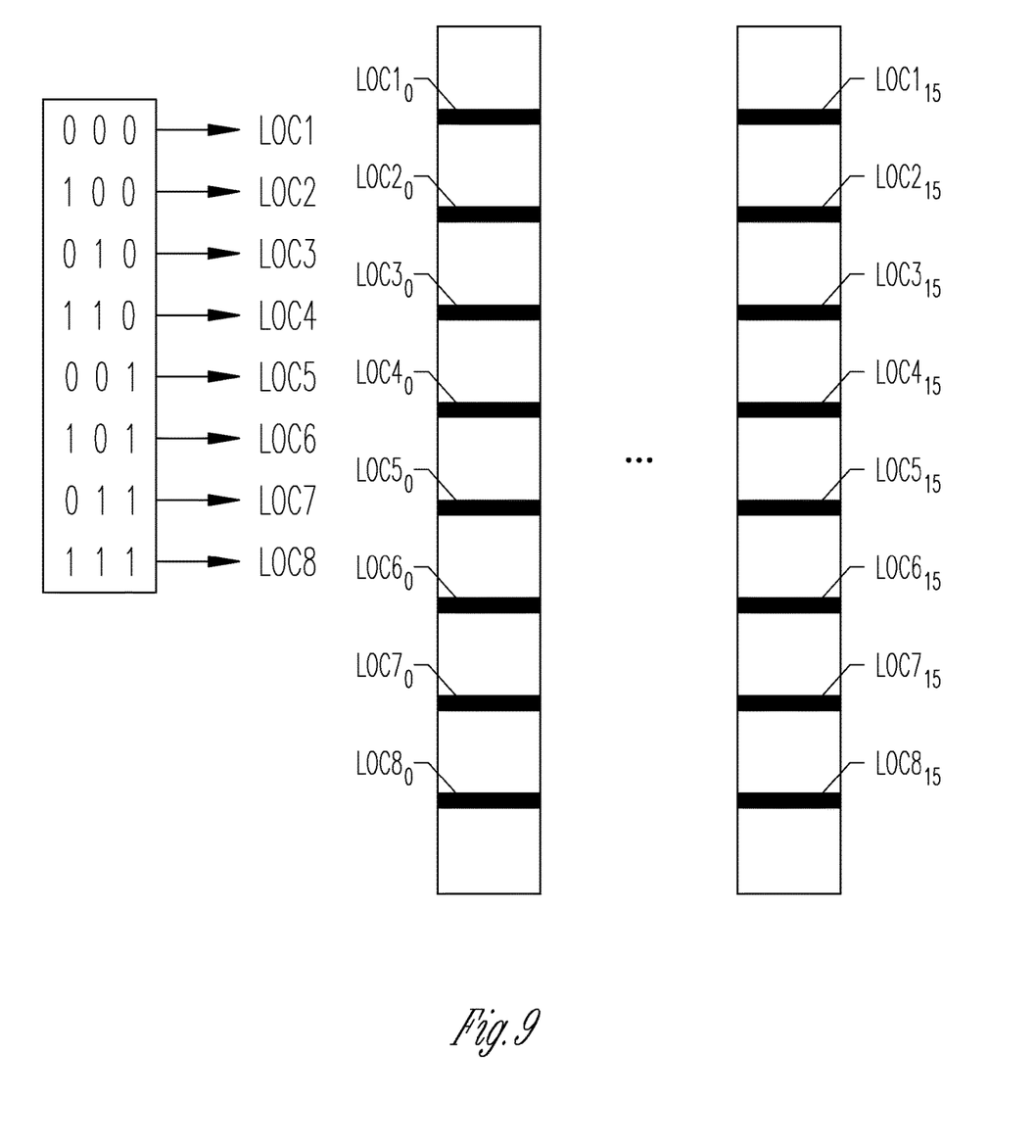
FIG. 9 is an illustrative drawing representing a third portion of a hash value used determine a third number of memory address locations larger than the second number.

FIG. 9 is an illustrative drawing representing a third portion of the hash values used determine a third number of memory address locations larger than the second number. More particularly, FIG. 9 is an illustrative drawing representing an example of relocation of content data from the first through fourth memory addresses location$1_0$-location$1_{15}$ to location$4_0$-location$4_{15}$ in one or more of the memory devices $230_1$-$230_{15}$ to fifth through eighth memory addresses location$5_0$-location$5_{15}$ to location$8_0$-location$8_{15}$ in the one or more of the memory devices $230_1$-$230_{15}$, based upon a third portion of the hash values H0-HN comprising first, second, and third bits $H_{b1}$, $H_{b2}$ and $H_{b3}$.

FIG. 7 represents an example first scenario in which a first hash bit $H_{b1}$ from the hash values H0-HN is used to provide two possible hash values for determining in which of the first and the second memory address locations to read and write content data within one or more of the memory devices $230_0$-$230_{15}$. FIG. 8 represent an example second scenario in which the hash value has been adjusted so that a combination of first and second hash bits $H_{b1}$ and $H_{b2}$ from the hash values H0-HN are used to provide four possible hash values for determining in which of the first, second, third, and fourth memory address locations to read or write content data within one or more of the memory devices $230_0$-$230_{15}$. FIG. 9 represent an example third scenario in which the hash value has been further adjusted so that a combination of first, second, and third hash bits $H_{b1}$, $H_{b2}$, and $H_{b3}$ from the hash values H0-HN are used to provide eight possible hash values for determining in which of the first through eighth memory addresses to store content data within one or more of the memory devices $230_0$-$230_{15}$.

The process of FIG. 4 is used to transition from the first scenario to the second scenario and to transition from the second scenario to the third scenario. During a transition from the first scenario to the second scenario, the process of FIG. 4 is used to relocate content data within one or more the memory devices $230_0$-$230_{15}$ from first or second memory address locations to third or fourth memory address locations, and also, to adjust the hash values from consisting of $H_{b1}$ to consisting of a combination of $H_{b1}$ and $H_{b2}$. During a transition from the second scenario to the third scenario, the process of FIG. 4 is used to relocate content values within one or more the memory devices $230_0$-$230_{15}$ from first, second, third, or fourth memory address locations to fifth, sixth, seventh, or eighth memory address locations, and also, to adjust the hash values from consisting of a combination of $H_{b1}$ and $H_b$ to hash values consisting of a combination of $H_{b1}$, $H_{b2}$, and $H_{b3}$.

FIG. 7 is an illustrative drawing representing storage of content data at first and second memory addresses in the memory devices $230_1$-$230_{15}$ based upon value of the first bit $H_{b1}$ within the hash values H0-HN. Content data having a hash value that includes a first hash bit $H_{b1}$ with a logic value 0 is stored at a first memory address location location$1_0$-location$1_{15}$ in one or more of memory devices $230_1$-$230_{15}$ and content data having a hash value that includes a first hash bit $H_{b1}$ with logic value 1 is stored at a second memory address location location$2_0$-location$2_{15}$ in one or more of memory devices $230_1$-$230_{15}$.

Referring to FIG. 6 and FIG. 7, hash values H1, H3, and H5 each have a first hash bit $H_{b1}$ with a logic value 0, and hash values H2 and H4 each have a first hash bit $H_{b1}$ with a logic value 1. In this first scenario, hash values used for each content item to determine a memory address location in which to write the content item is determined based upon a first portion of the hash value for that content data, specifically the first hash bit $H_{b1}$. The example memory controller 224 causes content data containing hash value H1, content data containing hash value H3, and content data containing hash value H5 to be stored at different ones of the first memory address locations locations$1_0$-location$1_{15}$ in the memory devices $230_1$-$230_{15}$. The example memory controller 224 causes content data containing hash value H2 and content data containing hash value H4 to be stored at different ones of the second memory address locations locations$2_0$-location$2_{15}$ in the memory devices $230_1$-$230_{15}$. The first sixteen content data item items received for storage that have corresponding hash vales with a first hash bit $H_{b1}$ having a value of logic 0 are stored in the sixteen first memory address locations locations$1_0$-location$1_{15}$ in the memory devices $230_1$-$230_{15}$. The first sixteen content data items received for storage that have corresponding hash vales with a first hash bit $H_{b1}$ having a value of logic 1 are stored in the sixteen second memory address locations locations$2_0$-location$2_{15}$ in the memory devices $230_1$-$230_{15}$.

In an example TCAM system 140, relocation of content data items from first address locations locations$1_0$-location$1_{15}$ in the memory devices $230_1$-$230_{15}$ to different address locations in the memory devices is triggered in response to unavailability of additional first memory address locations to store additional content data. Relocation of content data from second address locations locations$2_0$-location$2_{15}$ in the memory devices $230_1$-$230_{15}$ to different address locations in the memory devices also is triggered in response to unavailability of additional second memory address locations to store additional content data. In other words, content data relocation starts once the first or the second memory addresses are filled up across all of the memory devices.

FIG. 8 is an illustrative drawing representing relocation of content data from first or second memory addresses locations$1_0$-location$1_{15}$, locations$2_0$-location$2_{15}$ in one or more of the memory devices $230_1$-$230_{15}$ to one or more third or fourth memory address locations locations$3_0$-location$3_{15}$, locations$4_0$-location$4_{15}$ in the one or more of the memory devices $230_1$-$230_{15}$, based upon values of a second portion of the hash values H0-HN comprising a combination of first and second hash bits $H_{b1}$, $H_{b2}$ within the hash values H0-HN. In this second scenario, hash values have been adjusted such that in this second scenario, hash values used for each content item to determine a memory address location in which to write the content item is determined based upon a second subset of the hash value for that content data, specifically the first and second hash bits $H_{b1}$ and $H_{b2}$. Content data corresponding to a hash value having $H_{b1}$=0 and $H_{b2}$=0 is not relocated and remains stored at first memory address location in the memory devices $230_0$-$230_{15}$. Content data corresponding to a hash value having $H_{b1}$=0 and $H_{b}$2=1 is relocated from first memory addresses locations$1_0$-location$1_{15}$ in the memory devices $230_0$-$230_{15}$ to third memory addresses locations$3_0$-location$3_{15}$ in the memory devices. Content data corresponding to a hash value having $H_{b1}$=1 and $H_{b2}$=0 is not relocated and remains stored at second memory address locations locations$2_0$-location$2_{15}$ in the memory devices $230_0$-$230_{15}$. Content data corresponding to a hash value having $H_{b1}$=1 and $H_{b2}$=1 is relocated from second memory addresses locations$2_0$-location$2_{15}$ in the memory devices $230_0$-$230_{15}$ to fourth memory addresses locations$4_0$-location$4_{15}$ in the memory devices.

FIG. 9 is an illustrative drawing representing relocation of content data from the first through fourth memory addresses locations$1_0$-location$1_{15}$ to locations$4_0$-location$4_{15}$ in the memory devices $230_1$-$230_{15}$ to fifth through eighth memory addresses locations$5_0$-location$5_{15}$ to locations$8_0$-location$8_{15}$ based upon based upon a combination of the first, second, and third hash bits $H_{b1}$, $H_b$, and $H_{b3}$. In this third scenario, hash values have been adjusted again such that in this third scenario, hash values used for each content item to determine a memory address location in which to write the content item have is determined based upon a third portion of the hash value for that content data, specifically the first, second, and third hash bits $H_{b1}$, $H_{b2}$, and $H_{b3}$. In this example, content data corresponding to hash values $H_{b1}$, $H_{b2}$, $H_{b3}$=000 are stored at the first memory addresses locations$1_0$-location$1_{15}$. Content data items corresponding to hash values $H_{b1}$, $H_{b2}$, $H_{b3}$=100 are stored at the second memory addresses locations$2_0$-location$2_{15}$. Content data corresponding to hash values $H_{b1}$, $H_{b2}$, $H_{b3}$=010 are stored at the third memory addresses locations$3_0$-location$3_{15}$. Content data items corresponding to hash values $H_{b1}$, $H_{b2}$, $H_{b3}$=110 are stored at the fourth memory addresses locations$4_0$-location$4_{15}$. Content data corresponding to hash values $H_{b1}$, $H_{b2}$, $H_{b3}$=001 are stored at fifth memory addresses locations$51_0$-location$5_{15}$. Content data corresponding to hash values $H_{b1}$, $H_{b2}$, $H_{b3}$=101 are stored at sixth memory addresses locations$6_0$-location615. Content data items corresponding to hash values $H_{b1}$, $H_{b2}$, Hb3=011 are stored at seventh memory addresses location$7_0$-location$7_{15}$. Content data items corresponding to hash values $H_{b1}$, $H_{b2}$, $H_{b3}$=111 are stored at eighth memory addresses locations$8_0$-location$8_{15}$. A content data item may be relocated from a first memory address, one of locations$1_0$-location$1_{15}$, to a fifth memory address, one of locations$1_0$-location$1_{15}$. A content data item may be relocated from a second memory address, one of locations$2_0$-location$2_{15}$ to a sixth memory address, one of locations$6_0$-location$61_{15}$. A content data item may be relocated from third memory address, one of locations locations$3_0$-location$3_{15}$ to seventh memory address, one of locations$7_0$-location$7_{15}$. A content data item may be relocated from the fourth memory address, one of locations$4_0$-location$4_{15}$ to an eighth memory address, one of locations locations$8_0$-location$8_{15}$. In this example, content data corresponding to hash value H1 is stored in a memory device at one of the seventh memory addresses locations$7_0$-location$7_{15}$. The content data corresponding to hash value H2 is stored in a memory device at one of the eighth memory addresses locations$8_0$-location$8_{15}$. The content data corresponding to hash value H2 is stored in a memory device at one of the first memory addresses locations$1_0$-location$1_{15}$.

The above description is presented to enable any person skilled in the art to make and use an algorithmic ternary content addressable memory with content data relocation and hash adjustment. Various modifications to the examples will be readily apparent to those skilled in the art, and the generic principles defined herein may be applied to other embodiments and applications without departing from the spirit and scope of the invention. In the preceding description, numerous details are set forth for the purpose of explanation. However, one of ordinary skill in the art will realize that the invention might be practiced without the use of these specific details. In other instances, well-known processes are shown in block diagram form in order not to obscure the description of the invention with unnecessary detail. Identical reference numerals may be used to represent different views of the same or similar item in different drawings. Thus, the foregoing description and drawings of embodiments in accordance with the present invention are merely illustrative of the principles of the invention. Therefore, it will be understood that various modifications can be made to the embodiments by those skilled in the art without departing from the spirit and scope of the invention, which is defined in the appended claims.

The invention claimed is:

1. A content addressable memory circuit comprising:
   multiple integrated circuit memory devices that include memory address locations that share common memory addresses and that are coupled for simultaneous access;
   multiple buffer circuits, each buffer circuit operatively coupled to a different one of the multiple memory devices;
   a hash table that includes a plurality of hash values, wherein each hash value corresponding to one or more key values;
   one or more processor circuits;
   non-transitory memory including instructions incorporated into the non-transitory memory, the instructions configuring the one or more processors to perform operations comprising:
   assigning each hash value to a memory address location based upon a first portion of the hash value;
   causing the storing of each key value at the memory address location assigned to a first portion of a hash value that corresponds to the key value;
   causing a memory device to copy a first key value from a first memory address location within the memory device to a buffer circuit operatively coupled to the memory device;
   causing the memory device to copy the first key value from the buffer circuit operatively coupled to the memory device to a second memory address location of the memory device; and
   assigning a second portion of a hash value that corresponds to the first key value to the second memory address location of the memory device.

2. The content addressable memory circuit of claim 1, the operations further including:
   causing the first key to be inaccessible at the first memory address location of the memory device.

3. The content addressable memory circuit of claim 1, wherein assigning each hash value to a memory address location based upon a first portion of the hash value includes assigning each hash value to a memory address location based upon only one bit of the hash value; and
   wherein assigning the second portion of the hash value that corresponds to the first key value to the second memory address location of the memory device includes assigning only two bits of the hash value.

4. The content addressable memory circuit of claim 1, wherein assigning each hash value to a memory address location based upon a first portion of the hash value includes assigning each hash value to a memory address location based upon only two bits of the hash value; and
   wherein assigning the second portion of the hash value that corresponds to the first key value to the second memory address location of the memory device includes assigning only three bits of the hash value.

5. The content addressable memory circuit of claim 1, wherein each hash value includes multiple bits; and
   wherein a first portion of the first hash value includes fewer bits than the second portion of the first hash value.

6. The content addressable memory circuit of claim 1, wherein each hash value includes multiple bits; and
   wherein a first portion of each hash value includes fewer bits of the hash value than a second portion of the hash value.

7. A content addressable memory circuit comprising:
   multiple integrated circuit memory devices that include wordlines that share common wordline addresses and that are coupled for simultaneous access;
   multiple buffer circuits, each output buffer circuit operatively coupled to a different one of the multiple memory devices;
   a hash table that includes a plurality of hash values, wherein each respective hash value corresponding to one or more key values;
   one or more processor circuits;
   non-transitory memory including instructions incorporated into the non-transitory memory, the instructions configuring the one or more processors to perform operations comprising:
   assigning each hash value to a wordline address based upon a first portion of the hash value;
   storing each key value at the worldline having a wordline address assigned to a first portion of a hash value that corresponds to the key value;
   causing a memory device to copy a first key value from a first wordline having a first wordline address within the memory device to a buffer circuit operatively coupled to the memory device;
   causing the memory device to copy the first key value from the buffer circuit operatively coupled to the memory device to a second wordline having a second wordline address within the memory device; and
   assigning a second portion of a hash value that corresponds to the first key value to the second wordline address of the memory device.

8. The content addressable memory circuit of claim 7, wherein each hash value includes multiple bits; and
   wherein a first portion of the first hash value includes fewer bits than the second portion of the first hash value.

9. The content addressable memory circuit of claim 7, wherein each hash value includes multiple bits; and
wherein a first portion of each hash value includes fewer bits of the hash value than a second portion of the hash value.

10. The content addressable memory circuit of claim 7 the operations further including:
determining to relocate the first key value from the first wordline within the memory device to the second wordline within the memory device based upon the second wordline address matching the second portion of the hash value that corresponds to the first key value.

11. A method to relocate key value within a content addressable memory that includes multiple integrated circuit memory devices that include memory address locations that share common memory addresses and that are coupled for simultaneous access; multiple buffer circuits, each output buffer circuit operatively coupled to a different one of the multiple memory devices; and a hash table that includes a plurality of hash values, wherein each respective hash value corresponding to one or more key values, the method comprising:
assigning each hash value to a memory address location based upon a first portion of the hash value;
storing each key value at a memory address location assigned to a first portion of a hash value that corresponds to the key value;
causing a memory device to copy a first key value from a first memory address location within the memory device to a buffer circuit operatively coupled to the memory device;
causing the memory device to copy the first key value from the buffer circuit operatively coupled to the memory device to a second memory address location of the memory device; and
assigning a second portion of a hash value that corresponds to the first key value to the second memory address location of the memory device.

12. The method of claim 11, further including:
causing the first key to be inaccessible at the first memory address location of the memory device.

13. The method of claim 11,
wherein assigning each hash value to a memory address location based upon a first portion of the hash value includes assigning each hash value to a memory address location based upon only one bit of the hash value; and
wherein assigning the second portion of the hash value that corresponds to the first key value to the second memory address location of the memory device includes assigning only two bits of the hash value.

14. The method of claim 11,
wherein assigning each hash value to a memory address location based upon a first portion of the hash value includes assigning each hash value to a memory address location based upon only two bits of the hash value; and
wherein assigning the second portion of the hash value that corresponds to the first key value to the second memory address location of the memory device includes assigning only three bits of the hash value.

15. The method of claim 11,
wherein each hash value includes multiple bits; and
wherein a first portion of the first hash value includes fewer bits than the second portion of the first hash value.

16. The method of claim 11,
wherein each hash value includes multiple bits; and
wherein a first portion of each hash value includes fewer bits of the hash value than a second portion of the hash value.

17. The method of claim 11, further including:
determining to relocate the first key value from the first memory address location of the memory device to the second memory address location of the memory device based upon the second memory address matching the second portion of the hash value that corresponds to the first key value.

* * * * *

UNITED STATES PATENT AND TRADEMARK OFFICE
CERTIFICATE OF CORRECTION

PATENT NO. : 11,922,032 B1
APPLICATION NO. : 17/710798
DATED : March 5, 2024
INVENTOR(S) : Syed et al.

It is certified that error appears in the above-identified patent and that said Letters Patent is hereby corrected as shown below:

On the Title Page

On page 2, in Column 1, item (56) under "Other Publications", Lines 1-2, delete "Hardware-basedMulti-hash" and insert --Hardware-based Multi-hash-- therefor In the Claims In Column 12, Line 48, in Claim 7, delete "worldline" and insert --wordline-- therefor In Column 13, Line 18, in Claim 11, after "access;", insert a linebreak In Column 13, Line 20, in Claim 11, after "and", insert a linebreak Signed and Sealed this
Twenty-eighth Day of May, 2024

Katherine Kelly Vidal
*Director of the United States Patent and Trademark Office*